US008553917B2

(12) United States Patent
Arndt et al.

(10) Patent No.: US 8,553,917 B2
(45) Date of Patent: Oct. 8, 2013

(54) METHOD FOR ACTIVELY REDUCING OCCLUSION COMPRISING PLAUSIBILITY CHECK AND CORRESPONDING HEARING APPARATUS

(75) Inventors: Georg-Erwin Arndt, Obermichelbach (DE); Frank Koch, Erlangen (DE)

(73) Assignee: Siemens Medical Instruments Pte, Ltd, Singapore (SG)

( * ) Notice: Subject to any disclaimer, the term of this patent is extended or adjusted under 35 U.S.C. 154(b) by 626 days.

(21) Appl. No.: 12/381,491

(22) Filed: Mar. 12, 2009

(65) Prior Publication Data

US 2009/0238387 A1 Sep. 24, 2009

(30) Foreign Application Priority Data

Mar. 20, 2008 (DE) ........................ 10 2008 015 264

(51) Int. Cl.
*H04L 25/00* (2006.01)

(52) U.S. Cl.
USPC ............ 381/318; 381/312; 381/328; 381/56; 381/72

(58) Field of Classification Search
USPC ....................... 381/56, 94, 312–328, 72, 156
See application file for complete search history.

(56) References Cited

U.S. PATENT DOCUMENTS

| | | | | |
|---|---|---|---|---|
| 5,402,496 | A * | 3/1995 | Soli et al. | 381/94.2 |
| 6,658,122 | B1 * | 12/2003 | Westermann et al. | 381/312 |
| 8,150,044 | B2 * | 4/2012 | Goldstein et al. | 381/57 |
| 2008/0037797 | A1 * | 2/2008 | Goldstein et al. | 381/56 |
| 2008/0063228 | A1 * | 3/2008 | Mejia et al. | 381/318 |
| 2008/0240458 | A1 * | 10/2008 | Goldstein et al. | 381/72 |
| 2008/0252594 | A1 * | 10/2008 | Gregorio et al. | 345/156 |
| 2008/0253594 | A1 * | 10/2008 | Rasmussen et al. | 381/312 |
| 2009/0129619 | A1 * | 5/2009 | Nordahn | 381/328 |

FOREIGN PATENT DOCUMENTS

| | | | |
|---|---|---|---|
| DE | 10 2006 047 965 | A1 | 1/2008 |
| WO | WO 2004/021740 | A1 | 3/2004 |
| WO | WO 2006/037156 | A1 | 4/2006 |

OTHER PUBLICATIONS

Skaar, "A numerical algorithm for extrapolation of transfer functions", 2003, pp. 1213-1221, Signal Processing 83, Department of Physical Electronics, Norwegian University of Science and Technology, NO-7491 Trondheim, Norway, Elsevier Science B.V.

* cited by examiner

*Primary Examiner* — Eugene Lee
*Assistant Examiner* — Fang-Xing Jiang

(57) ABSTRACT

Adaption of signal processing for actively reducing occlusion in hearing apparatuses, and in particular in hearing aids, is to be automated further. For this purpose, a transducer transmission function, which is defined for the transmission path from the input of a receiver via the auditory canal to the output of a microphone, be subjected to an automatic plausibility check. An adjustable filter via which the microphone signal is fed back is only altered if the transducer transmission function is plausible according to a predefined criterion.

6 Claims, 2 Drawing Sheets

METHOD FOR ACTIVELY REDUCING OCCLUSION COMPRISING PLAUSIBILITY CHECK AND CORRESPONDING HEARING APPARATUS

CROSS REFERENCE TO RELATED APPLICATIONS

This application claims priority of German application No. 10 2008 015 264.1 DE filed Mar. 20, 2008, which is incorporated by reference herein in its entirety.

FIELD OF INVENTION

The present invention relates to a method for actively reducing occlusion in a hearing apparatus. In this case a sound in an auditory canal is picked up by a microphone while outputting a corresponding microphone signal and the picked-up microphone signal is filtered using an adaptive filter. The filtered microphone signal is fed back to an input of a receiver which is used to emit the sound in the auditory canal. At least part of a transducer transmission function, which is defined for the transmission path from the input of the receiver via the auditory canal to the output of the microphone, is measured and the adaptive filter is adjusted as a function thereof. Here a hearing apparatus is taken to mean any sound-emitting apparatus that can be worn in or on the ear, for example a hearing aid, a headset, headphones and the like.

BACKGROUND OF INVENTION

Hearing aids are portable hearing apparatuses which are used to cater for the hard of hearing. Different hearing aid designs such as behind-the-ear hearing aids (BTE), hearing aid with external receiver (RIC: receiver in the canal) and in-the-ear hearing aids (ITE), for example also concha hearing aids or canal hearing aids (ITE, CIC), are provided in order to accommodate the numerous individual needs. The hearing aids listed by way of example are worn on the outer ear or in the auditory canal. However there are also bone conduction hearing instruments, implantable or vibrotactile hearing aids available on the market. The damaged hearing is stimulated either mechanically or electrically in this case.

As fundamental components hearing aids basically comprise an input transducer, an amplifier and an output transducer. The input transducer is usually a sound pick-up, for example a microphone, and/or an electromagnetic receiver, for example an induction coil. The output transducer is usually implemented as an electroacoustic transducer, for example miniature loudspeaker, or as an electromechanical transducer, for example bone conduction receiver. The amplifier is conventionally integrated in a signal processing unit. FIG. 1 shows this basic construction using the example of a behind-the-ear hearing aid. One or more microphone(s) 2 for picking up the sound from the environment are fitted in a hearing aid housing 1 for wearing behind the ear. A signal processing unit 3, which is also integrated in the hearing aid housing 1, processes the microphone signals and amplifies them. The output signal of the signal processing unit 3 is transmitted to a loudspeaker or receiver 4 which emits an acoustic signal. The sound is optionally transmitted, via a sound tube which is fixed to an otoplastic in the auditory canal, to the eardrum of the apparatus wearer. The hearing aid, and in particular the signal processing unit, is supplied with power by a battery 5 that is also integrated in the hearing aid housing 1.

An unpleasant effect when wearing a hearing aid is that the wearer's own voice sounds unnatural. This is due to the fact that the wearer's own voice is conducted into the auditory canal via bone conduction and causes a certain sound pressure there, in particular at lower frequencies. If the auditory canal is open the corresponding compression waves can be conducted to the outside. If the auditory canal is closed by the hearing aid however, then a higher sound pressure builds up here which is called the occlusion effect and since it is unnatural is deemed unpleasant.

A generic method for actively reducing occlusion in hearing aids is known from document WO 2004/021740 A1 and document WO 2006/037156 A1. The first document describes the transducer transmission function from the input of the receiver via the auditory canal to the output of the auditory canal microphone in more detail. It can be determined very accurately in situ using the hearing aid as a measuring instrument. The transducer transmission function is complex, i.e. a function of absolute value and phase over frequency.

In an incompletely adaptive implementation of actively reducing occlusion the measured transducer transmission function is used to determine in a computer the optimum configuration of digital signal processing for actively reducing occlusion. This optimization process could basically also take place completely automatically. However there is the problem here of the algorithm being irreversibly incorrectly changed in certain situations, or of a great deal of computing time being required. Manual intervention is necessary or helpful in these situations.

SUMMARY OF INVENTION

The object of the present invention therefore consists in further automating an adaptive implementation of actively reducing occlusion.

According to the invention this object is achieved by a method for actively reducing occlusion in a hearing apparatus by picking up a sound in an auditory canal via a microphone while outputting a corresponding microphone signal, filtering the microphone signal using an adjustable filter, feeding back the filtered microphone signal to an input of a receiver which is used to emit sound in the auditory canal, measuring at least part of a transducer transmission function which is defined for the transmission path from the input of the receiver via the auditory canal to the output of the microphone, and adjusting the adjustable filter subject to the transducer transmission function, the transducer transmission function being subjected to an automatic plausibility check, and the adjustable filter only being altered if the transducer transmission function is plausible according to a predefined criterion. The term "adjustable" does not exclude part of the filter from being adaptive, i.e. being capable of automatic adjustment by way of an adaptation rule.

Also provided according to the invention is a hearing apparatus with active occlusion reduction, comprising a receiver for emitting sound in an auditory canal, a microphone for picking up a sound in the auditory canal and for outputting a corresponding microphone signal, an adjustable filter for filtering the microphone signal, the filtered microphone signal being fed back to the input of the receiver, a measuring device for measuring at least part of a transducer transmission function which is defined for the transmission path from the input of the receiver via the auditory canal to the output of the microphone, and an adjusting mechanism for adjusting the adjustable filter subject to the transducer transmission function, and a checking device for automatically checking the plausibility of the transducer transmission function, wherein the adjustable filter can be altered by the adjusting mechanism if the transducer transmission function is plausible according to a predefined criterion.

Advantageously, according to the present invention a check is made before adaptation of the occlusion reduction algorithm as to whether the measured transducer transmission function is plausible. It can thus be ensured that the algorithm, which determines optimum configuration, does not enter an exceptional state from which it does not emerge again, or only emerges with difficulty. This prevents an excessive solution space for the algorithm or an excessive amount of unnecessary computing time.

The measured part of the transducer transmission function is preferably smoothed for the plausibility check. Certain measurement uncertainties can be compensated thereby.

It may also be advantageous if the transducer transmission function is measured in a first frequency range and is extrapolated with the aid of a model in a second frequency range on the basis of the measured data. A reliable measurable range for example can therefore be used in order to be able to estimate a range that is less reliably measurable for the transducer function or the plausibility check.

According to one variant the transducer transmission function can be deemed implausible if its absolute value in a predefined frequency range is lower than a predefined threshold. Clogging of the hearing apparatus with cerumen can be detected thereby for example.

The transducer transmission function can also be deemed implausible if its phase in a predefined frequency range is below a predefined minimum phase. It can thereby also be checked for example whether one of the components involved is defective or whether the measuring signal was too quiet.

The transducer transmission function can also be deemed implausible if its value, including absolute value and phase, is outside of a predefined tolerance enclosure in the space which is defined by the coordinates absolute value, phase and frequency. Using this kind of tolerance enclosure it can be detected whether the hearing apparatus is working correctly in a certain context. However, the tolerance enclosure can also be used to keep the computing time for changing the algorithm within certain limits. If, for example, the transducer transmission function is not in a very narrow tolerance enclosure, then a small change in the location of the hearing apparatus in the ear can quickly bring about the desired outcome and a longer computing time can be avoided by a change in the algorithm.

BRIEF DESCRIPTION OF THE DRAWINGS

The present invention will be described in more detail with reference to the accompanying drawings, in which.

DETAILED DESCRIPTION OF INVENTION

The following exemplary embodiments described in more detail are preferred embodiments of the present invention.

Figure 2:
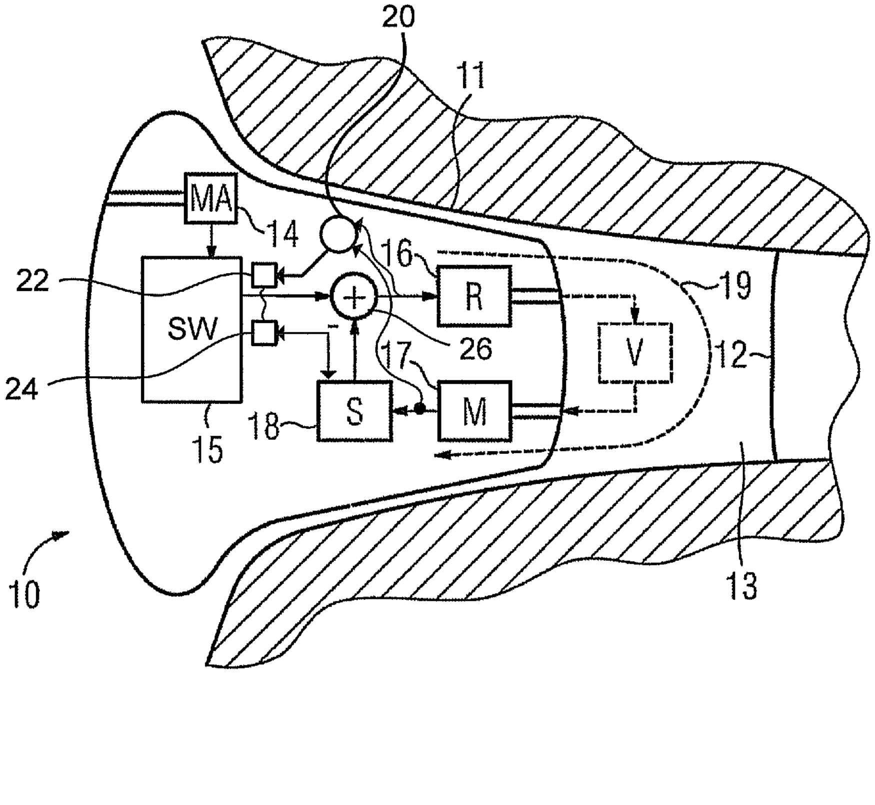
FIG. 2 shows a schematic diagram of an in-the-ear hearing aid with the fundamental components for actively reducing occlusion.

FIG. 2 shows an ITE hearing aid 10 in cross-section, as is inserted in an auditory canal 11. The auditory canal 11 is terminated by an eardrum 12. A closed space 13 is produced between the eardrum 12 and the eardrum-side end of the ITE hearing aid 10. The isolation of this space leads to the known unpleasant occlusion effects.

Figure 1:
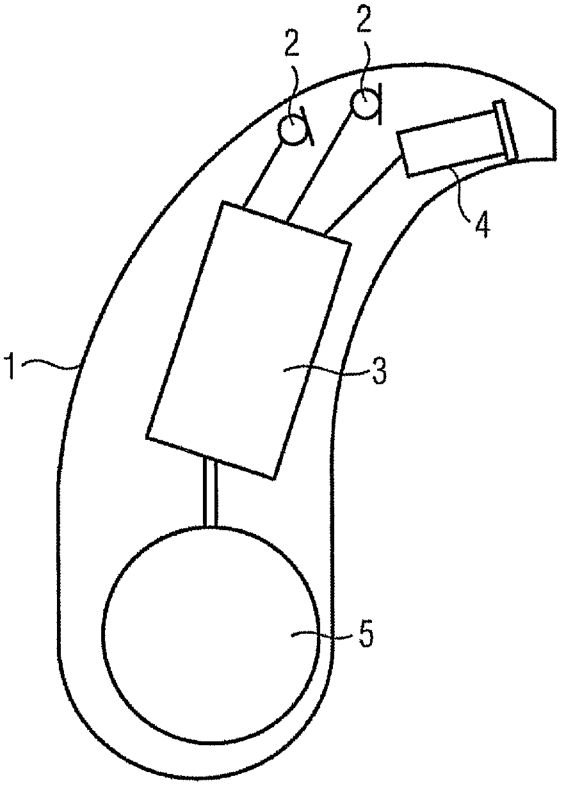
FIG 1 (Prior art)
FIG. 1 shows the basic construction of a hearing aid according to the prior art.

The ITE hearing aid 10 has an outwardly directed microphone 14 to pick up ambient sound (cf. microphone 2 in FIG. 1). The microphone signal is passed to a signal processing unit 15 which processes and amplifies the signal in the conventional manner (cf. signal processing unit 3 in FIG. 1). The processed signal is supplied to a receiver 16 or 4 in the conventional manner and this converts the signal into a sound and emits it into the auditory canal space 13. The wearer's own voice produces an unnaturally high sound pressure in the auditory canal space 13 owing to the occlusion as a result of the ITE hearing aid 10 (for example also in the case of an earpiece of a BTE hearing aid). This may be passively reduced by a vent or actively reduced by the circuit design shown in FIG. 2 (in short: occlusion reduction). The sound in the auditory canal space 13, which contains the increased fraction owing to the wearer's own voice, is picked up by an auditory canal microphone 17. The output signal of the auditory canal microphone 17 is filtered by a loop filter 18 and is fed back by way of signal combiner 26 (e.g., adder) to the input of the receiver 16. The polarity of the filtered microphone signal is inverted (represented with the negative sign shown at the input terminal of combiner 26, which receives the filtered microphone signal). It will be appreciated that optionally additional signal processing could be performed via additional digital signal processing elements (for example A-D converters). The individual transmission functions are R, V, M and S. This produces the feedback function 1/(1+RVMS). This should be kept below 1 for example for a frequency range from 200 to 300 Hz. The transmission function R of the receiver 16 and M of the auditory canal microphone 17 are specified so as to be apparatus-specific. The transmission function V represents the acoustic signal path in the auditory canal space 13 from the receiver 16 to the auditory canal microphone 17. It depends on the individual shape of the auditory canal 11, on the insertion depth of the ITE hearing aid 10, on the shell shape of the ITE apparatus 10 and on the degree of occlusion. For a specific wearing situation this transmission function V is strictly specified, however. Variable on the other hand is the transmission function S of the loop filter 18. It should be adapted for example in the manner illustrated in document WO 2004/021740 A1, so the occlusion effect is optimally reduced. The transducer transmission function of the transmission path 19 from the input of the receiver 16, through the auditory canal space 13 to the output of the auditory canal microphone 17, i.e. the product RMV, is measured for this purpose. This measured transducer transmission function RVM of the transmission path 19 is complex, i.e. both the amplitude and the phase of a signal are affected during transmission. According to the feature (for example hearing aid is too loose), it is more advantageous to evaluate the amplitude information, phase information or other properties of the measured transducer transmission function RVM.

However, the case can occur where the system per se is not in order or cannot work properly. This is the case for example if the receiver 16 or auditory canal microphone 17 has failed or the sound output of the receiver 16 and/or the sound output of the auditory canal microphone 17 is blocked by cerumen. In such cases the transducer transmission function is not plausible. A measuring device 20 may be used to measure at least one characteristic of a a transducer transmission function (e.g., amplitude and/or phase) in a transmission path from the input of the receiver 16 via the auditory canal 13 to an output of the microphone 17. As will be appreciated by one skilled in the art, the transducer transmission function may indicate the amount of amplitude attenuation and/or phase shift (analogous to the transducer transmission function described in the context of FIG. 3) encountered by a signal, which enters the transmission path as an input of the receiver 16, continues through auditory canal 13 and exits the transmission path as an output of the microphone 17. A checking device 22 may be included to automatically check the plausibility of the calculated transducer transmission function. If the result of the checking performed by checking device 22 indicates a plausible transducer transmission function, only then adjustable filter 18 can be altered by a filter adjusting mechanism 24. These cases can be detected using a plausibility check. It proceeds according to the principle of the block diagram in FIG. 4. The transducer transmission function is measured in a first step S1. Sometimes the measurement data is so dispersed that smoothing of the raw data of the measured transmission function is necessary according to step S2. It may also be necessary to extrapolate the measured data. As a rule it is difficult to determine the transducer transmission function for specific frequencies, in particular low frequencies. The accuracy for this frequency range can be increased by determining model-based parameters in a higher frequency range, and this model is used in the frequency range that is difficult to measure.

Figure 3:
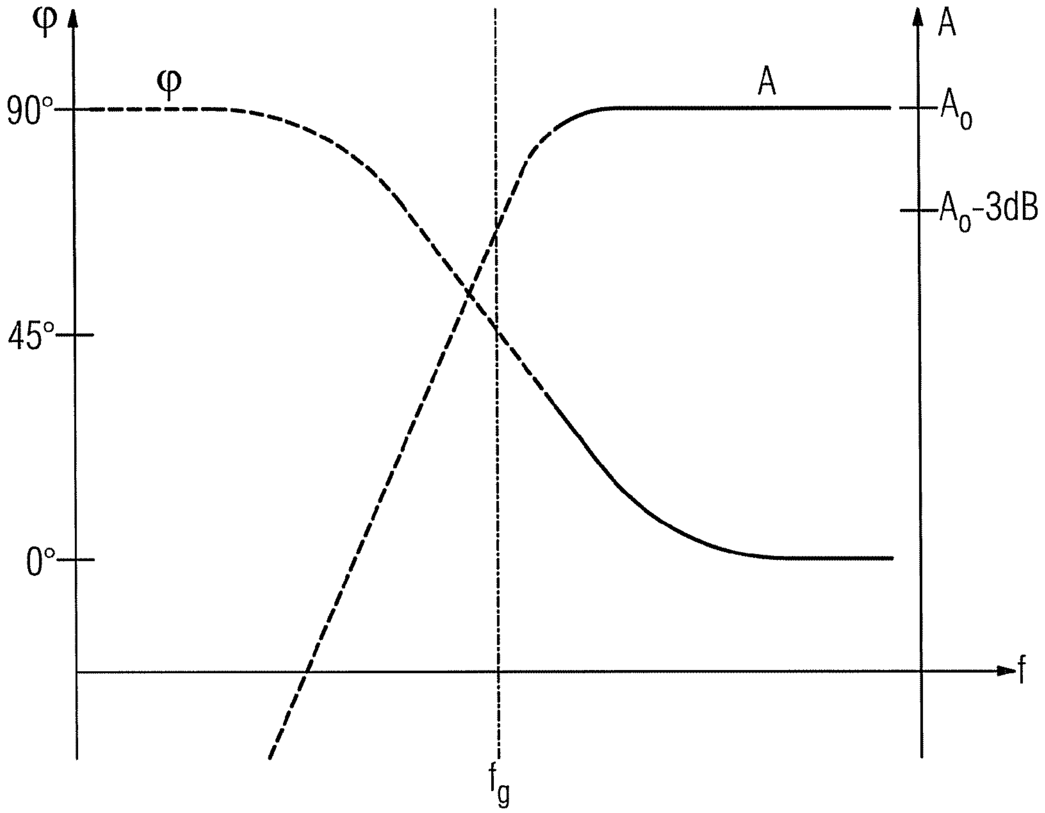
FIG. 3 shows a high-pass-type transducer transmission function and FIG. 4 shows a block diagram relating to the inventive plausibility check for transducer transmission functions.

Extrapolation of the transducer transmission function can be described using the example of a first order high-pass filter according to FIG. 3. The transmission function of a first order high-pass filter is fully described by the cut-off frequency $f_g$. If it is known that a first order high-pass filter exists in an unknown system for measuring, only the cut-off frequency $f_g$ remains to be determined. The model parameter cut-off frequency $f_g$ is determined in that measurement data is taken from a frequency range that is categorized as "reliable". The example of FIG. 3 shows the phase $\phi$ and the amplitude A of a first order high-pass filter, including the cut-off frequency $f_g$. The data in the high frequency range is categorized as reliable and the amplitude A and the phase $\phi$ are therefore shown by a solid line in the figure. The course of the transducer transmission function in the lower frequency range is uncertain as a result of the measurements, however. Using the reliable data from the high frequency range the parameter cut-off frequency $f_g$ is determined via the variation in cut-off frequency $f_g$ of a parameterizable high-pass transmission function in such a way that the measurement data corresponds as far as possible with the correctly parameterized high-pass transmission function. The high-pass transmission function found in this way is now used for the frequency ranges that cannot be reliably measured, in this case the low frequency ranges (cf. dotted amplitude and phase characteristics in FIG. 3). The measured transducer transmission function supplemented by extrapolation can accordingly be evaluated for the plausibility check.

If the transmission path 19 from the input of the receiver 16 to the output of the auditory canal microphone 17 is blocked, the absolute value of the transmission function RVM is low for a certain frequency range. In view of the plausibility it is therefore necessary to extract the amplitude of the transmission function or evaluate its absolute value according to step S3. In this way cases can be detected in which the receiver 16 or the auditory canal microphone 17 are defective. However, the acoustic transmission path from receiver to microphone may also be blocked, for example as a result of clogging with cerumen.

Furthermore, the phase of the transducer transmission function can be extracted according to step S4. With regard to the plausibility check it is known that at low frequencies in the range of 100 Hz the phase cannot assume any desired values. In particular there is a minimum phase at low frequencies due to a series of high-pass filters (receiver, microphone, analog microphone amplifier). The typical value of the minimum phase can be given as a function of the transducer. If a lower measured phase is the minimum phase, the measuring result does not itself have to be in order. For example the measuring signal could have been too quiet if the S/N ratio was temporarily too low. In this case the measurement must be repeated with a louder measuring signal to obtain a valid measuring result.

Figure 4:
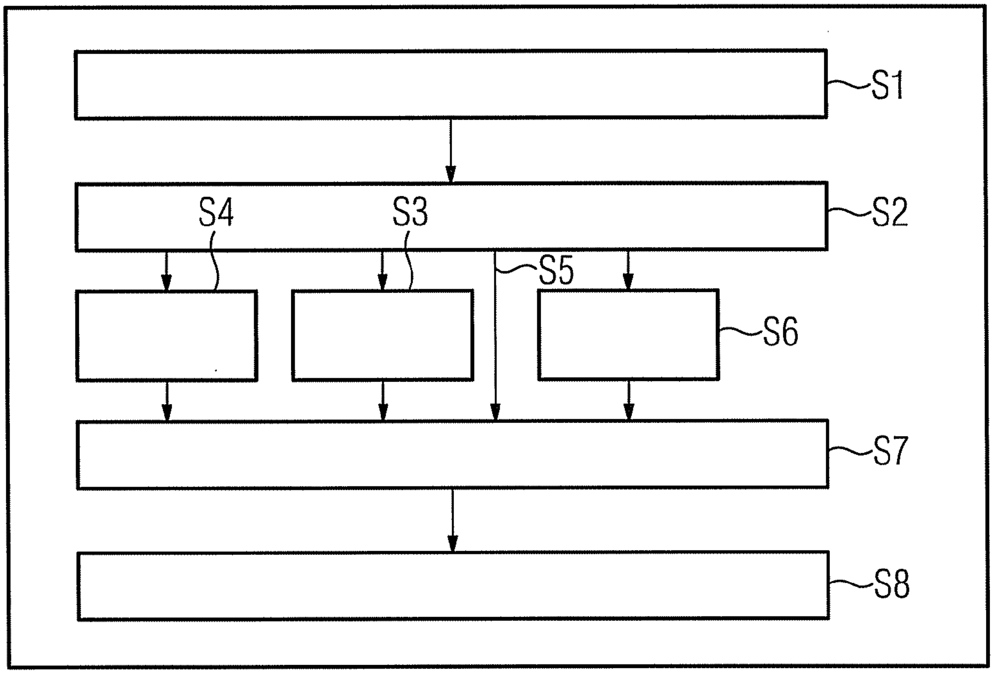

Sometimes the measured transducer transmission function can also be evaluated directly according to step S1 or a transmission function processed according to step S2, and this is indicated by the arrow S5 in FIG. 4. However, it is usually advantageous for the evaluation to carry out standardization of the transmission function with any desired frequency, and this is indicated by step S6 in FIG. 4.

The data obtained from steps S3 to S6 may for example accordingly be compared with certain thresholds according to step S7 or evaluated using specific criteria. Therefore, as mentioned, the phase can for example be compared with a minimum phase. The absolute value of the transmission function should not lie below a minimum absolute value for a higher frequency range either. The standardized measured or extrapolated transmission function, which represents a spatial curve in the amplitude-phase frequency space, can for example be compared with a tolerance enclosure around this curve. If the tolerance enclosure is never left the measured transmission function is accepted as valid or plausible. A decision is therefore made in step S8 on the basis of the comparison in step S7 as to whether the transmission function is valid or invalid or plausible or implausible. Only after plausibility has been decided is the reduction in occlusion optimized by adapting the loop filter S.

The advantage of this procedure is that only expedient transducer transmission functions are used for determining the optimum configuration of signal processing (in particular of the loop filter). The optimization algorithm is therefore protected from converging into a disadvantageous state as a result of an inexpedient transducer transmission function. Overall this limits the solution space for the algorithm and reduces the computing time thereby. An indication of the cause of the fault can also be given in the case of certain properties of the measured transmission function. Thus for example a leak can be indicated if the cut-off frequency of the high-pass-type transmission function is relatively high.

The invention claimed is:

1. A method for actively reducing occlusion in a hearing apparatus, comprising:

receiving a sound in an auditory canal via a microphone located in the auditory canal while outputting a corresponding microphone signal;

filtering the microphone signal using an adjustable filter;

feeding back the filtered microphone signal to an input of a receiver which is used to emit sound in the auditory canal, wherein the feeding back is performed by way of a signal combiner configured to invert a polarity of the filtered microphone signal;

defining a transmission path from the input of the receiver via the auditory canal to an output of the microphone;

measuring at least one characteristic of a transducer transmission function of the transmission path;

determining if the transducer transmission function for the transmission path is plausible via a plausibility check; and automatically adjusting the adjustable filter to optimize occlusion reduction only when the transducer transmission function is plausible according to the plausibility check.

2. The method as claimed in claim 1, wherein the transducer transmission function is smoothed for the plausibility check.

3. The method as claimed in claim 1, wherein the transducer transmission function is measured in a first frequency range and extrapolated to a second frequency range.

4. The method as claimed in claim 1, wherein the transducer transmission function is implausible when an absolute value of the transducer transmission function in a predefined frequency range is lower than a predefined threshold.

5. The method as claimed in claim 1, wherein the transducer transmission function is implausible when a phase of the transducer transmission function in a predefined frequency range is below a predefined minimum phase.

6. The method as claimed in claim 1, wherein the transducer transmission function is implausible when a value of the transducer transmission function, including absolute value and phase, is outside of a predefined tolerance enclosure in the space which is defined by the coordinates absolute value, phase and frequency.

* * * * *